United States Patent
Clopp et al.

(10) Patent No.: US 11,698,542 B2
(45) Date of Patent: Jul. 11, 2023

(54) EYEWEAR DEVICE HINGE ASSEMBLY

(71) Applicant: Snap Inc., Santa Monica, CA (US)

(72) Inventors: Emily Lauren Clopp, Santa Monica, CA (US); Jun Lin, Sherman Oaks, CA (US); Douglas Wayne Moskowitz, Marina Del Rey, CA (US); Stephen Andrew Steger, Santa Monica, CA (US); Nicholas Daniel Streets, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 260 days.

(21) Appl. No.: 16/362,250

(22) Filed: Mar. 22, 2019

(65) Prior Publication Data

US 2019/0293969 A1 Sep. 26, 2019

Related U.S. Application Data

(60) Provisional application No. 62/647,057, filed on Mar. 23, 2018.

(51) Int. Cl.
*G02C 5/22* (2006.01)
*G02C 11/00* (2006.01)
*G02C 5/10* (2006.01)

(52) U.S. Cl.
CPC ............ *G02C 11/10* (2013.01); *G02C 5/22* (2013.01); *G02C 5/10* (2013.01); *G02C 2200/16* (2013.01)

(58) Field of Classification Search
CPC ... G02C 5/22; G02C 5/10; G02C 5/14; G02C 11/00; G02C 11/10; G02C 1/00; G02C 5/2245; G02C 2200/06

(Continued)

(56) References Cited

U.S. PATENT DOCUMENTS 8,016,415 B2 * 9/2011 Figler .................... G02C 7/101
351/158
8,353,593 B2 * 1/2013 Senatore .................. G02C 5/16
351/158

(Continued)

FOREIGN PATENT DOCUMENTS

CN 88203065 11/1988
CN 102681178 9/2012

(Continued)

OTHER PUBLICATIONS

"International Application Serial No. PCT/US2019/023692, International Preliminary Report on Patentability dated Oct. 8, 2020", 11 pgs.

(Continued)

*Primary Examiner* — Nicholas R. Pasko
(74) *Attorney, Agent, or Firm* — Schwegman Lundberg & Woessner, P.A.

(57) ABSTRACT

A hinge assembly mounted on a housing of form part of an electronic device includes a metal hinge member having a hinge post that extends through a mounting hole in a wall of the housing, the hinge post being connected to a metal anchor plate on an inner side of the housing wall to be rotationally and axially fast with the anchor plate. The anchor plate may has an area multiple times the size of a footprint of the hinge member, with fastening the hinge post and the anchor plate in some embodiments being by a welded connection.

20 Claims, 5 Drawing Sheets

(58) Field of Classification Search
USPC ..... 351/158, 153, 41, 111, 121, 113; 16/228
See application file for complete search history.

(56) References Cited

U.S. PATENT DOCUMENTS

| | | | |
|---|---|---|---|
| 8,905,541 B2* | 12/2014 | Blum | G02C 1/10 |
| | | | 351/158 |
| 9,304,331 B2* | 4/2016 | Carrara | A61B 5/6803 |
| 9,910,298 B1* | 3/2018 | Sales | G02C 11/10 |
| 2012/0127420 A1 | 5/2012 | Blum et al. | |
| 2012/0155064 A1 | 6/2012 | Waters | |
| 2013/0010256 A1* | 1/2013 | Haddock | G02C 5/2272 |
| | | | 351/159.31 |
| 2013/0278881 A1 | 10/2013 | Kokonaski et al. | |
| 2015/0002806 A1 | 1/2015 | Santarelli | |
| 2016/0041395 A1* | 2/2016 | Yajima | G02B 27/017 |
| | | | 359/630 |
| 2016/0246059 A1* | 8/2016 | Halpin | G02B 27/0176 |
| 2017/0075141 A1* | 3/2017 | Blum | H02J 7/00 |
| 2017/0108713 A1* | 4/2017 | Blum | G02C 5/22 |
| 2017/0371164 A1* | 12/2017 | Liao | G02B 27/017 |
| 2018/0252940 A1* | 9/2018 | Rabut | G02C 5/2281 |
| 2019/0198981 A1* | 6/2019 | Moore | G02C 5/22 |
| 2019/0198983 A1* | 6/2019 | Moore | G02B 27/0176 |

FOREIGN PATENT DOCUMENTS

| | | |
|---|---|---|
| CN | 102681178 A | 9/2012 |
| CN | 103353676 | 10/2013 |
| CN | 103353676 A | 10/2013 |
| CN | 111936916 | 11/2020 |
| CN | 111936916 B | 5/2022 |
| CN | 114721175 | 7/2022 |
| IT | TV20130076 | 11/2014 |
| WO | 2019183550 | 9/2019 |

OTHER PUBLICATIONS

"International Application Serial No. PCT US2019 023692, International Search Report dated Jul. 15, 2019", 4 pgs.
"International Application Serial No. PCT US2019 023692, Written Opinion dated Jul. 15, 2019", 9 pgs.
"Chinese Application Serial No. 201980021130.4, Office Action dated Sep. 1, 2021", w English Translation, 16 pgs.
"Chinese Application Serial No. 201980021130.4, Office Action dated Sep. 1, 2021", With English translation, 16 pgs.
"European Application Serial No. 19715767.0, Response filed May 10, 2021 to Communication pursuant to Rules 161(1) and 162 EPC dated Oct. 30, 2020", 24 pgs.
"Chinese Application Serial No. 201980021130.4, Response filed Dec. 30, 2021 to Office Action dated Sep. 1, 2021", w/English Claims, 32 pgs.
"Korean Application Serial No. 10-2020-7030239, Notice of Preliminary Rejection dated Apr. 15, 2022", w/ English translation, 15 pgs.
"Korean Application Serial No. 10-2020-7030239, Response filed Aug. 11, 2022 to Notice of Preliminary Rejection dated Apr. 15, 2022", w/ English Claims, 24 pgs.
"Korean Application Serial No. 10-2020-7030239, Notice of Preliminary Rejection dated Dec. 19, 2022", w English Translation, 12 pgs.
"Korean Application Serial No. 10-2020-7030239, Response filed Feb. 16, 2023 to Notice of Preliminary Rejection dated Dec. 19, 2022", w English Claims, 32 pgs.

* cited by examiner

EYEWEAR DEVICE HINGE ASSEMBLY

This application is a continuation of and claims the benefit of priority of U.S. Patent Application Ser. No. 62/647,057, filed on Mar. 23, 2018, which is hereby incorporated by reference herein in its entirety.

BACKGROUND

Many electronic devices have components that are hingedly connected to a body of the device. For example, electronics-enabled eyewear devices (also referred to as smart glasses) typically have a pair of temples that are hingedly connected to an eyewear frame holding a pair of lenses. The mounting of a hinge formation on a device body to form part of the hinge mechanism for such connections can be problematic.

Such hinge mountings are regularly exposed to torsional and tensile loading, and should be able to tolerate such loading without damaging a housing for electronics components on which the hinge mechanism is mounted, which housings are in many instances of a polymeric plastics material. Moreover, the hinge mounting is often preferably watertight, to protect electronics components located within the housing from environmental or ambient moisture. Existing mechanisms for incorporating hinge mechanisms in housings forming part of electronic devices do not satisfy these requirements.

BRIEF DESCRIPTION OF THE DRAWINGS

The appended drawings illustrate merely example embodiments of the present disclosure and cannot be considered as limiting its scope. To facilitate collation of numbered items in the description to the drawings, the first digit of each numbered item typically corresponds to the figure in which that item first appears. In the drawings.

DETAILED DESCRIPTION

Figure 1:
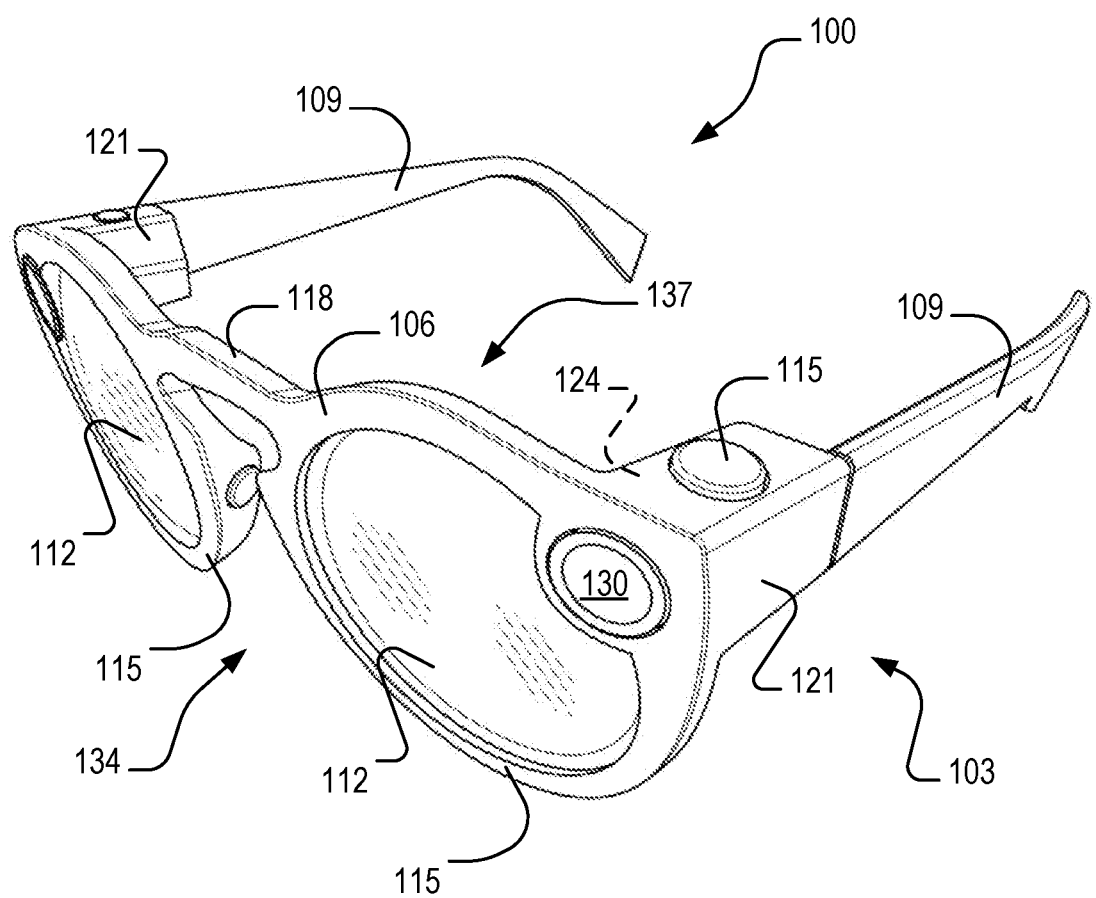
FIG. 1 is a schematic of a three-dimensional view of an electronics-enabled device in the form of a pair of smart glasses having a pair of temples hingedly mounted on an eyewear frame at opposite lateral end pieces of the eyewear frame, according to an example embodiment.

One aspect of the disclosure provides a hinge assembly mounted on a housing forming part of an electronic device, the hinge assembly comprising a metal hinge member having a hinge post that extends through a mounting hole in a wall of the housing, the hinge post being connected to a metal anchor plate on an inner side of the housing wall to be rotationally and axially fast with the anchor plate.

The anchor plate may have an area multiple times the size of a footprint of the hinge member, removal of the hinge member in a direction transversely away from the housing wall being prevented by obstruction of the hinge plate against an inner side of the housing wall. In some embodiments, the hinge member defines a shoulder or flange that bears against the housing wall on an outer side thereof, so that at least part of the housing wall is sandwiched between the anchor plate and the flange or shoulder, movement of the hinge member axially into the mounting hole being resisted by obstruction of the flange or shoulder against the housing wall.

In some embodiments, the anchor plate may be rotationally keyed to the housing wall, so as to prevent rotation of the anchor plate relative to the housing, and so that rotation of the hinge member about a rotational axis extending transversely through the housing wall is prevented by the anchor plate, via its rotational connection to the hinge member.

The anchor plate is in some embodiments welded to the hinge post. In some such embodiments, connection of the anchor plate to the hinge post may be by laser spot welding. In a particular embodiment, a series of laser spot welds extend circumferentially about a central axis of the hinge post. Instead, or in addition, the anchor plate may be clamped to the housing wall by a securing screw that is screwingly received in the hinge post and that has a screw head located on the inner side of the housing wall.

In some embodiments, the hinge member is sealingly mounted in the mounting hole. In one such embodiment, an annular sealing member is received on the hinge member, for example being located in a radial recess in the hinge post and being in sealing engagement both with the hinge post and the mounting wall.

In some embodiments, the hinge assembly is in thermally conductive communication with one or more heat-generating electronic components located within the housing, so that the anchor plate and the hinge member form part of a thermal conductive path providing for heat management by conduction of heat through the hinge assembly.

A benefit of the techniques outlined above and described in more detail below with reference to example embodiments illustrated in the drawings is that it provides for increased structural integrity of the hinge mount. Tensile loading (e.g., by forces pulling a temple away from the housing) is transferred to the housing over an increased area provided by the anchor plate, while torsional loading (e.g., by twisting forces exerted on a temple) is likewise transmitted to the housing at a greater lever arm provided by a periphery of the anchor plate. These and additional benefits will become clear from the detailed description that follows. A further benefit is that the relatively large metal components provided in some embodiments by the anchor plate and the hinge member together forms a robust and reliable thermal conductive path whose reliability of connection is ensured in some instances by welded and claimed connection.

The description that follows includes devices, systems, methods, and techniques that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known structures and techniques are not necessarily shown in detail.

FIG. 1 shows an oblique front view of an electronics-enabled device in the example form of an eyewear device 100 that has incorporated there in a pair of hinge mechanisms mounted on a body 103 of the eyewear device 100 according to an example embodiment of the disclosed techniques. The body 103 comprises a front piece or frame 106 and a pair of temples 109 hingedly connected to the frame 106 for supporting the frame 106 in position on a user's face when the temples 109 are in an extended or wearable configuration, as shown in FIG. 1. The frame 106 is in this example embodiment at least partially provided by one or more substantially rigid molded components formed of a polymeric plastics material.

The eyewear device 100 has a pair of optical elements in the form of a pair of optical lenses 112 held by corresponding optical element holders in the form of a pair of lens rims 115 forming part of the frame 106. The rims 115 are connected by a bridge 118. In other embodiments, one or both of the optical elements can be a display, a display assembly, or a lens and display combination. The eyewear device 100 can, in such embodiments, provide a virtual reality headset or an augmented reality display.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction. In this example embodiment, each end piece 121 is formed by a separate molded plastics component.

The temples 109 are hingedly coupled to the respective end pieces 121 by respective hinge mechanisms so as to be hingedly movable between a wearable mode (as shown in FIG. 1) and a collapsed mode in which the temples 109 are pivoted towards the frame 106 to lie substantially flat against it. Details of the mounting of a hinge member forming part of the hinge mechanism at each of the end pieces 121 will be discussed in greater depth with reference to FIGS. 2-5.

In this description, directional terms such as front, back, forwards, and rearwards are to be understood with reference to a direction of view of a user when the eyewear device 100 is worn. Thus, the frame 106 has a front side 134 facing away from the user when worn, and an opposite rear side 137 facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal plane of the eyewear device 100 thus extends more or less between the end pieces 121 (with horizontal directions lying within the horizontal plane including a lateral direction extending between the end pieces 121, and a fore-and-aft direction perpendicular thereto), while a vertical or upright direction of the eyewear device 100 extends transversely to the horizontal plane, such that the lenses 112 have a more or less vertical or upright orientation. These terms are to be understood without consideration of the current actual orientation of the eyewear device 100 relative to Earth's gravity.

The eyewear device 100 has onboard electronics 124 including a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (in this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital photo as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121.

The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a push button mechanism 115 mounted on the frame 106 so as to be accessible on top of one of the end pieces 121 for pressing by the user.

Figure 2:
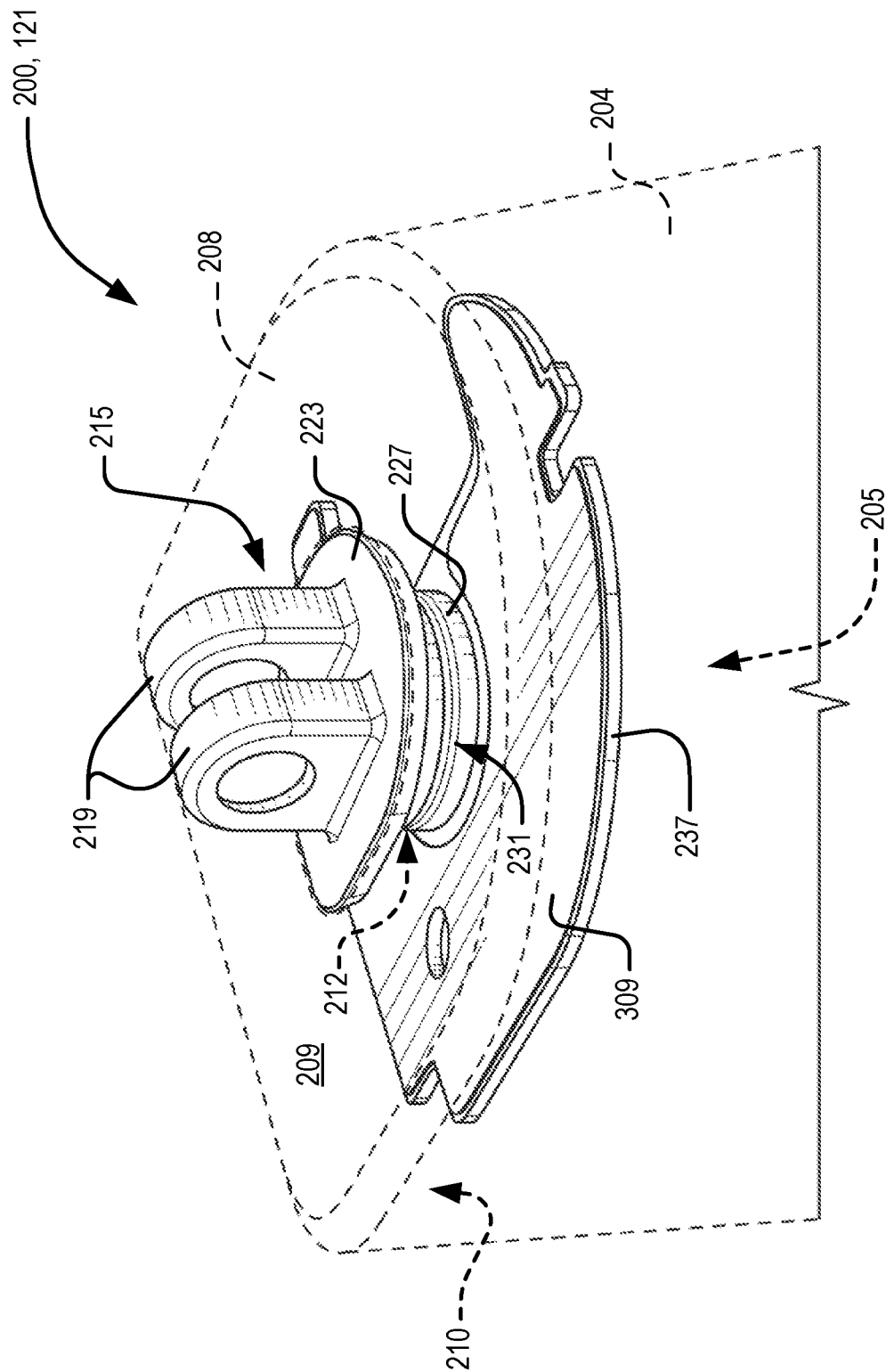
FIG. 2 is a schematic three-dimensional view of a housing assembly incorporated in an end piece of the eyewear device of FIG. 1, according to an example embodiment, a polymeric plastics housing of the end piece being shown in broken lines in FIG. 2 to expose components of a hinge assembly located within a housing cavity defined by the housing.

FIG. 2 shows a housing assembly 200 to be incorporated in the eyewear device 100 to provide one of the end pieces 121, according to one example embodiment. To afford a clearer view of internal components of the housing assembly 200, a housing 204 on which a hinge member 215 is mounted is shown in FIG. 2 in broken lines. The housing 204 is a molded component of a polymeric plastics material and defines a housing cavity 205 in which a number of electronic components of the eyewear device is to be housed (see, for example, FIG. 5). A rear side of the housing cavity 205 (i.e., that part of the housing 204 that faces rearwards when it forms part of the eyewear device 100) is closed off by a rear wall 208. The housing cavity 205 is located towards and inner side 210 of the rear wall 208, while an outer side 209 of the rear wall 208 faces towards the exterior of the housing 204.

The rear wall 208 defines a mounting hole 212 extending transversely through it for receiving and holding part of the hinge member 215. In this description, directional terms related to an unspecified axis (such as the terms axial, circumferential, radial, and the like) are to be understood as defining directions relating to an axis extending centrally through the mounting hole 212, being substantially perpendicular to the rear wall 208.

The hinge member 215 is a metal component of one-piece construction, and includes a circular cylindrical hinge post 227 extending co-axially through the complementary circular cylindrical mounting hole 212 in the rear wall 208. The hinge member 215 further includes a hinge formation in the form of a pair of hinge knuckles 219 that project axially away from the rear wall 208, when the hinge post 227 is seated in the mounting hole 212. It will be appreciated that the hinge knuckles 219 are in use be connected to a complementary set of hinge knuckles on an associated temple 109, for example being connected by a hinge pin that connects the hinge knuckles 219 to the temple's knuckles to provide a hinge mechanism connecting the temple 109 to the housing 204.

Between the hinge knuckles 219 and the hinge post 227, the hinge member 215 defines a base flange 223 that is larger in diameter than the hinge post 227. Obstruction of the base flange 223 against the rear wall 208 thus locates the hinge member 215 in axial position, and prevents axial passage of the hinge member 215 through the mounting hole 212. Note that, in this example embodiment, the mounting hole 212 defines a shallow depression or cavity at its mouth (i.e., on the outer side 209 of the rear wall 2082) complementary in shape and size to the base flange 223, so that an axially outer surface of the base flange 223 is flush with the surface of the rear wall 208 on its outer side 209. Note further that the base flange 223 and the cavity in which it is located is non-circular in circumferential outline, thus keying or indexing the hinge knuckles 219 in their proper orientation about the longitudinal axis of the hinge member 215.

The hinge post 227 defines in its cylindrical surface a radial recess 231 for receiving an O-ring 303 (FIG. 3) to provide a sealing interface between the hinge post 227 and the rear wall 208 within the mounting hole 212.

As will be described in greater detail with reference to FIGS. 3 and 4, the hinge post 227 is connected at the inner side 210 of the rear wall 208 to an anchor plate 237. The anchor plate 237 extends transversely relative to the hinge post 227 (in this case lying in a plane perpendicular to the longitudinal axis of the hinge post 227), being substantially parallel to the rear wall 208. Part of the rear wall 208 is sandwiched or clamped, without any play, between the anchor plate 237 and the base flange 223 of the hinge member 215.

The anchor plate 237 is a metal component, in this example embodiment being a stamped sheet metal plate, and has an area significantly larger than that of the base flange 223 to which it is opposed. In this example, the approximate radius of the anchor plate 237 relative to the hinge post 227 is more than twice that of the base flange 223. Note, further, that the anchor plate 237 has a non-circular shape, and is received in the housing cavity 205 such that it is rotationally keyed to the rear wall 208. With such rotational keying is meant that no relative rotation between the anchor plate 237 and the housing 204 about the hinge post 227 is possible, due to physical obstruction between the anchor plate 237 and the housing 204.

The anchor plate 237 is both rotationally and translationally fast with the hinge post 227. In this embodiment, as will be described with reference to FIG. 4, the hinge post 227 is welded to the anchor plate 237. The anchor plate 237 is in this embodiment furthermore attached to the rear wall 208 by a double-sided adhesive layer 309 (FIG. 3) located in adhesive contact between the anchor plate 237 and the inner side 210 of the rear wall 208. The double-sided adhesive layer 309 provides a redundant water seal (in addition to that provided by the O-ring 303), and also provides an additional support for mechanical transfer to the housing 204, via the anchor plate 237, of loads applied to the hinge knuckles 219.

Figure 3:
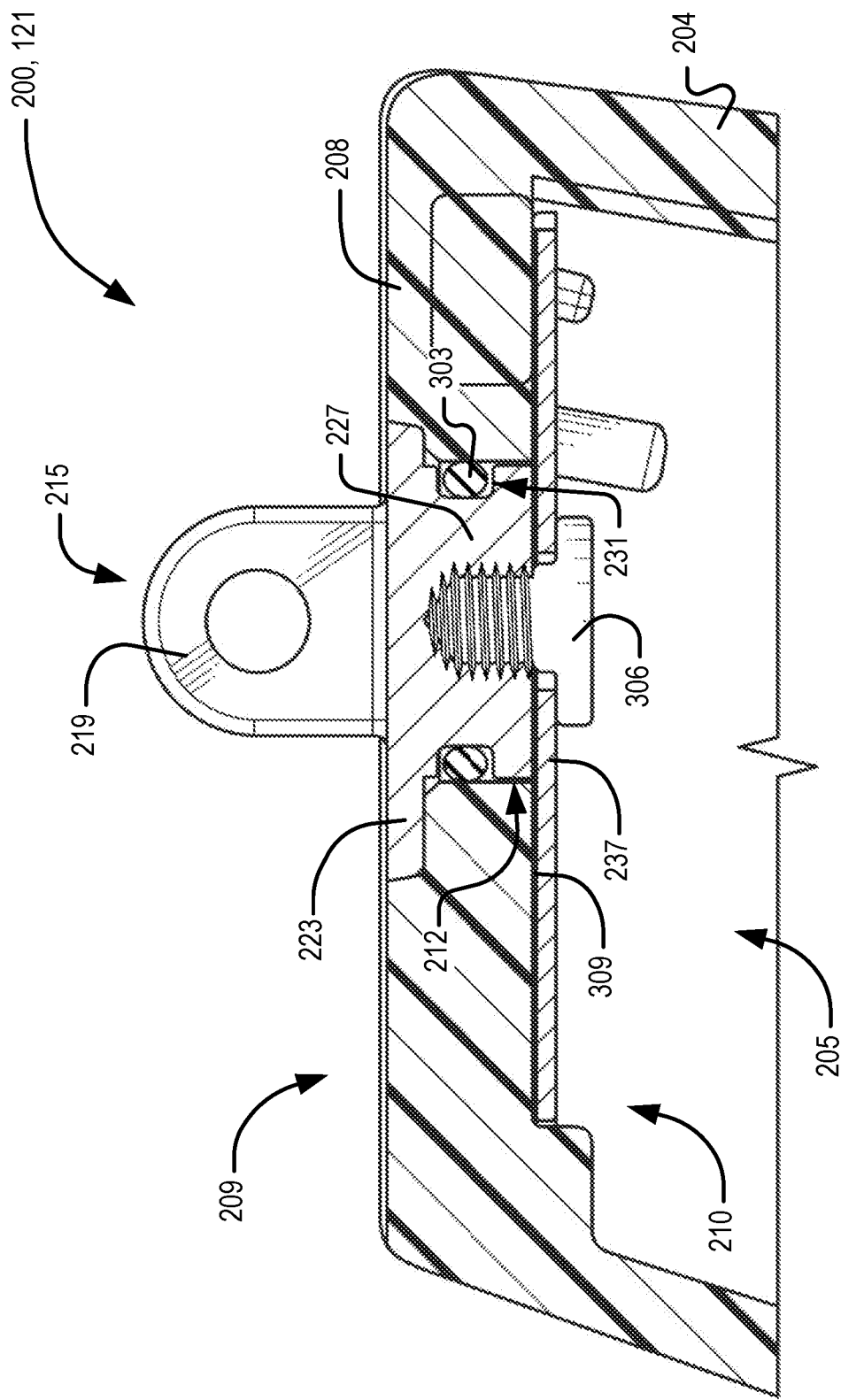
FIG. 3 is a cross-sectional side view of the end piece housing and hinge assembly of FIG. 2, according to an example embodiment.

Turning now to FIG. 3, it will be seen that the connection of the anchor plate 237 to the hinge post 227 in this example embodiment further includes a securing screw 306 that passes through an opening in the anchor plate 237 and is screwingly received co-axially within the hinge post 227. Part of the anchor plate 237 is not only held captive between the head of the securing screw 306 and the hinge post 227, but is clamped onto the hinge post 227 by the head of the securing screw 306.

The screw 306 is thus tensioned during assembly such that it is under continuous tensile load, continuously exerting a compressive clamping force on the anchor plate 237. Note that the adhesive layer 309 is in this example embodiment located not only between the anchor plate 237 and the rear wall 208, but extends to the interface between the anchor plate 237 and the hinge post 227. The clamping force applied by the securing screw 306 thus promotes adhesive connection via the adhesive layer 309 of the anchor plate 237 to the hinge post 227. Some example embodiments may dispense with the securing screw 306.

The sealing interface provided by the O-ring 303 between the hinge post 227 and the rear wall 208 can clearly be seen in FIG. 3. Radial compression of the O-ring 303 ensures a watertight seal between the hinge post 227 and the rear wall 208. It will be appreciated that the mounting mechanism thus in this instance provides for a double seal to prevent ingress of water and other contaminants into the housing cavity 205, the double seal being provided by the O-ring 303 and the adhesive layer 309 respectively.

As illustrated in FIG. 3, the anchor plate 237 in this example embodiment bears against the rear wall 208, being separated from the rear wall 208 by the adhesive layer 309 only. As will be described with reference to the embodiments of FIG. 5, the anchor plate 237 can in other embodiments be separated from the rear wall 208 by one or more components sandwiched between the anchor plate 237 and the rear wall 208, such as, for example parts of a plastic insert overmolded on to the anchor plate 237.

Figure 4:
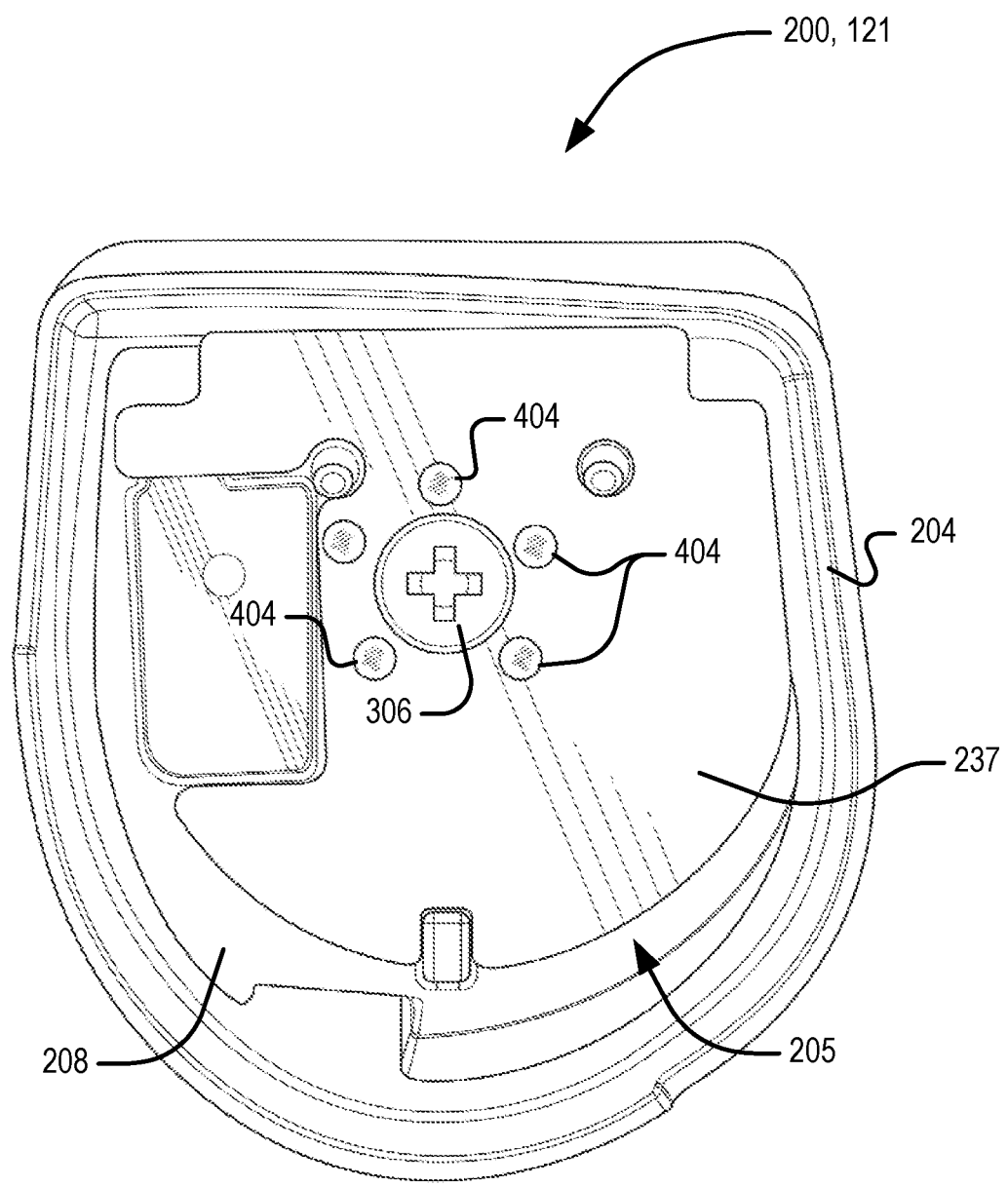
FIG. 4 is a bottom view of the hinge assembly of FIG. 3, according to an example embodiment, the bottom view being seen from within the housing cavity to show an anchor plate forming part of the hinge assembly.

In FIG. 4, the anchor plate 237 is shown in profile as seen from the interior of the housing cavity 205. Note that the non-circular outline of the anchor plate 237 is located in close abutment with the peripheral wall of the housing 204, and is rotationally keyed to the housing 204 by being intermeshed with one or more protuberances on the inner side 210 rear wall 208.

FIG. 4 also illustrates the welded connection between the anchor plate 237 and the hinge post 227. In particular, the welded connection in this example embodiment comprises a series of spot welds 404 formed in a laser welding operation. The spot welds 404 comprise a series of welds extending circumferentially around the central axis of the hinge post 227. It will be appreciated that the spot welds 404 connect the anchor plate 237 and the hinge post 227 together to prevent both axial separation and relative rotation.

Figure 5:
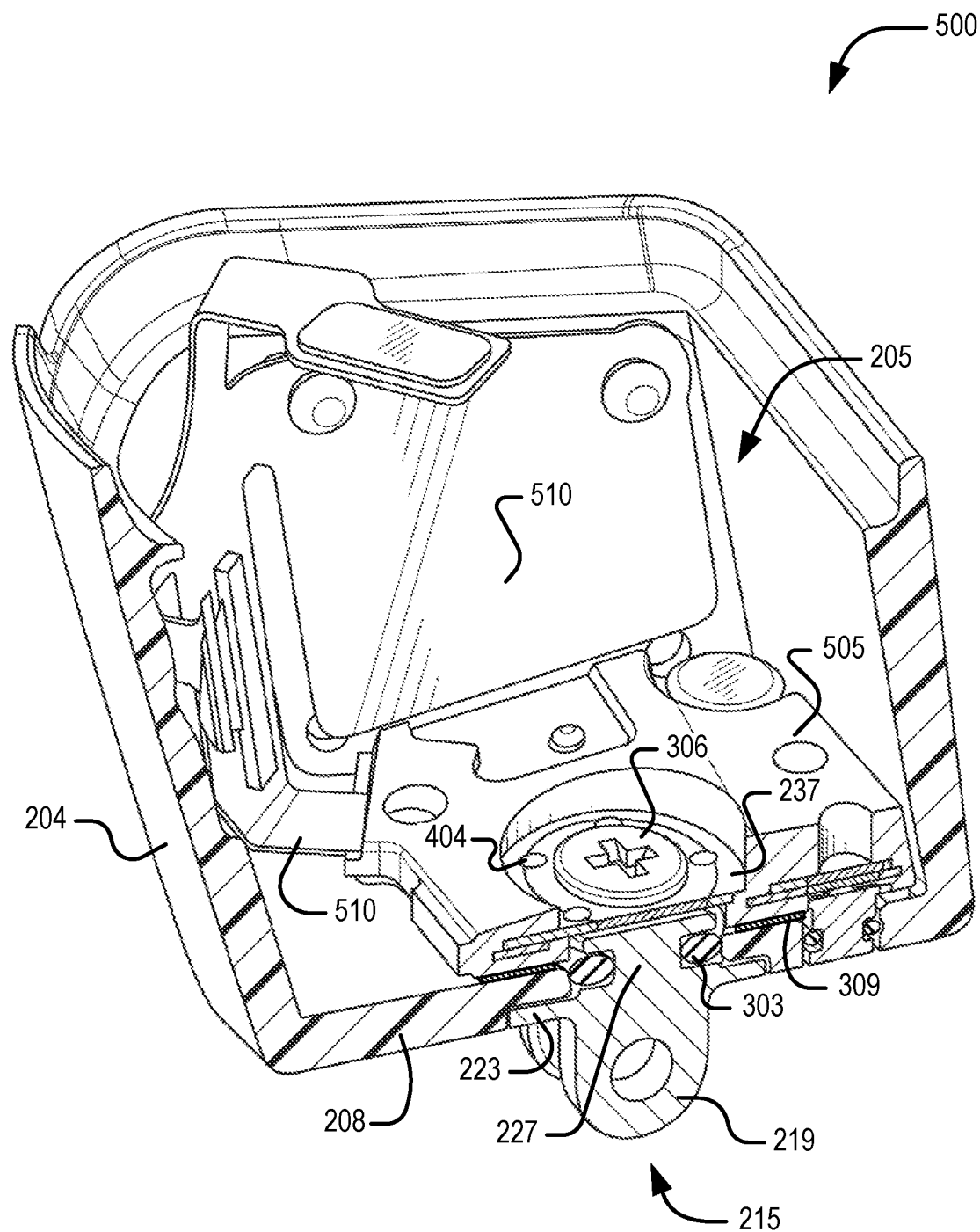
FIG. 5 is a part-sectional three dimensional view of a housing-and hinge assembly to form part of an end piece of an eyewear device, according to an example embodiment.

In addition to providing for structural connection of the hinge member 215 to the housing 204, the anchor plate 237 in some embodiments serves a further function of providing a mounting point for one or more internal components located in the housing cavity 205. FIG. 5 illustrates one such example embodiment, in which a housing assembly 500 includes an electronics mounting structure in the form of a plastics insert 505 overmolded on to the anchor plate 237 prior to assembly. A flexible printed circuit board 510 is mounted at least partially on the composite mounting structure provided by the anchor plate 237 and the plastics insert 505. A number of other internal electronics components are additionally mounted on the composite mounting structure thus provided.

Yet further, the anchor plate 237 and hinge member 215 can in some embodiments serve as thermal conductors in a heat management system to conduct heat away from the housing cavity 205. In the example embodiment of FIG. 5, for example, the PCB 510 (and, in some embodiments, additional heat-generating components in the housing cavity 205) is connected in heat transfer relationship with the anchor plate 237, so that heat generated by the PCB 510 during operation is conducted away from the housing cavity 205, via the anchor plate 237 and hinge member 215, to the hinge knuckles 219 and beyond.

It is a benefit of the hinge mounting techniques described with reference to the example embodiments that they provide for greater structural integrity and tolerance of axial and rotational loads than is the case with existing mounting techniques. In particular, axial tensile loads are borne by substantially the entire inner surface of the rear wall 208, due to transfer of such tensile loads by the hinge member 215 to the anchor plate 237 through the welded connection and the clamping screw 306. Torsional loads are likewise resisted by rotational keying of the anchor plate 237 to the housing 204. The increased lever arm of torsional resistive forces acting on the periphery of the anchor plate 237, as compared to, say, a key on the hinge post, means that smaller resistive forces are required to resist a given torsional load. In this manner, reliability and structural integrity of the housing assembly 200 is substantially greater than existing systems.

The mounting mechanism thus provides for the assembly of a metal hinge to the plastics housing 204 without visible external fasteners, thereby being both aesthetically pleasing and tamper-resistant. Yet further, reliable water-sealing of the hinge mounting is provided by a redundant sealing mechanism provided by the O-ring 303 and the double-sided adhesive layer 309.

Also, location of the metal anchor plate 237 within the housing cavity 205, being of a substantially stronger and more rigid material than is the case with the polymeric plastics housing 204, provides a reliable and convenient fastening point for other assembled components within the housing 204. An even further benefit of the disclosed mounting techniques is that the overall stack provides a heat transfer path for heat sinking between internal components and the exterior. Clamped contact between the anchor plate 237 and the hinge member 215 promotes reliable and effective heat conduction across the interface between them It will be seen that various different example embodiments are disclosed by the foregoing description. A non-exhaustive selection of disclosed embodiments are recapitulated below in a numbered list. It is emphasized that the disclosure is not limited to the numbered exampled embodiments.

Example 1

A housing assembly comprising:
a housing defining a housing cavity for holding electronics components, the housing including a housing wall that defines a mounting hole extending transversely therethrough, the housing wall having an outer side and having an opposite inner side which borders the housing cavity;
a hinge member mounted at least partially in the mounting hole, the hinge member comprising a hinge formation projecting from the outer side of the housing wall for connection to a complementary hinge formation to form a hinge mechanism, the hinge member being anchored against axial movement through the mounting hole towards the inner side; and
an anchor plate located on the inner side of the housing wall, the anchor plate being transverse to the mounting hole and being connected to the hinge member such that axial movement of the hinge formation away from the outer side of the housing wall is resisted by obstruction of the anchor plate by the housing wall.

Example 2

The housing assembly of example 1, wherein the hinge member is anchored against axial movement towards the inner side of the housing wall by a flange forming part of the hinge member, the flange being located on the outer side of the housing wall and extending transversely relative to the mounting hole, such that at least part of the housing wall is sandwiched between the anchor plate and the flange.

Example 3

The housing assembly of example 2, wherein the anchor plate is larger in area than the flange of the hinge member.

Example 4

The housing assembly of any one of examples 1-3 wherein the hinge member further comprises a hinge post extending axially through at least part of the mounting hole, the anchor plate being connected to the hinge post.

Example 5

The housing assembly of example 4, further comprising a sealing member located radially about the hinge post to provide a sealing interface between the hinge post and the housing wall.

Example 6

The housing assembly of example 4 or example 5, wherein the connection of the anchor plate to the hinge member is such that the anchor plate is rotationally fast with the hinge member, the anchor plate being rotationally anchored relative a longitudinal axis of the hinge post, rotation of the hinge member relative to the mounting hole being resisted by rotational anchoring of the anchor plate within the housing.

Example 7

The housing assembly of example 6, wherein the anchor plate is non-circular in outline and is located in a substantially complementary non-circular cavity defined by the housing, thereby to resist rotation of the anchor plate relative to the housing.

Example 8

The housing assembly of any one of examples 4-7, wherein the hinge member and the anchor plate are metal components.

Example 9

The housing assembly of example 8, wherein the housing wall is of a polymeric plastics material.

Example 10

The housing assembly of example 8 or example 9, wherein the connection of the anchor plate to the hinge post comprises a welded connection.

Example 11

The housing assembly of example 10, wherein the welded connection of the anchor plate to the hinge post comprises one or more laser spot welds.

Example 12

The housing assembly of example 10 or example 11, wherein the connection of the anchor plate to the hinge post further comprises a securing screw co-axial with the mounting hole and screwingly received in the hinge post, such that a part of the anchor plate is held captive between a head of the securing screw and the hinge post.

Example 13

The housing assembly of any one of examples 8-12, further comprising one or more electronics components mounted in the housing cavity via the anchor plate, the anchor plate serving as a mounting base for the one or more electronics components.

Example 14

The housing assembly of example 13, further comprising an electronics mounting structure located in the housing cavity and attached to the anchor plate, the electronics mounting structure being a polymeric plastics component overmolded on to the anchor plate.

Example 15

The housing assembly of any one of examples 8-14, wherein the anchor plate and the hinge member are thermally connected for heat conduction between them, the anchor plate being connected in heat transfer relationship to one or more heat generating components within the housing cavity, so that the anchor plate and the hinge member form part of a heat transfer path from the housing cavity to an external heatsink.

Example 16

The housing assembly of any one of examples 1-15, further comprising an adhesive layer located between the anchor plate and the housing wall, adhesively attaching the anchor plate to the inner side of the housing wall.

Example 17

The housing assembly of example 16, wherein the adhesive layer is shaped and positioned such as to create a seal against ingress or moisture into the housing cavity via the mounting hole.

Example 18

A device that comprises:
a device body; and
the housing assembly of any one of examples 1-17, the housing assembly being incorporated in the device body.

Example 19

The device of example 18, wherein the device is an eyewear device comprising:
an eyewear frame that defines one or more optical element holders for holding respective optical elements within view of a user, when the eyewear device is worn, the housing assembly being incorporated in the eyewear frame such that the hinge formation of the hinge member projects from a lateral end portion of the eyewear frame;
a temple that is hingedly connected to the eyewear frame to be displaceable relative to the eyewear frame between a folded position and an extended position in which the eyewear device is in a wearable configuration; and
a hinge mechanism by which the temple is hingedly connected to the eyewear frame, the hinge mechanism comprising cooperating hinge formations provided respectively by:
the hinge formation of the hinge member mounted on the housing assembly; and
a hinge formation attached to a proximal end of the temple.

Example 20

The eyewear device of example 19, wherein the eyewear device has incorporated therein a pair of the housing assemblies according to any one of examples 1-17, each of which is located at a respective lateral end portion of the eyewear frame.

Example 21

A method of manufacturing an eyewear device, the method comprising:
locating a hinge member on a housing wall of a housing for electronics components such that a hinge formation forming part of the hinge member projects away from an outer side of the housing wall for connection to a complementary hinge formation of a hinge mechanism to hingedly connect a temple component to an eyewear frame, a flange forming part of the hinge member being located on the outer side of the housing wall;
locating an anchor plate on an inner side of the housing wall, within a housing cavity defined by the housing, the anchor plate being substantially parallel to the housing wall; and
attaching the anchor plate to the hinge member, such that at least part of the housing wall is sandwiched between the anchor plate and the flange, movement of the hinge member away from the outer side of the housing wall being resisted by obstruction of the anchor plate against the housing wall.

Example 22

The method of example 21, wherein the locating of the hinge member on the housing comprises inserting a hinge post forming part of the hinge member co-axially into a mounting hole extending through the housing wall.

Example 23

The method of example 22, wherein the attaching of the anchor plate to the hinge member comprises welding the anchor plate to the hinge post.

Example 24

The method of example 23, wherein the welding of the anchor plate to the hinge post comprises a spot laser welding operation.

Example 25

The method of any one of examples 22-24, wherein the attaching of the anchor plate to the hinge member keys the anchor plate rotationally to the hinge member, and wherein the anchor plate is non-rotatably located within the housing cavity, so that rotation of the hinge member relative to the mounting hole is resisted by rotational anchoring of the anchor plate to the housing.

Example 26

The method of any one of examples 21-25, wherein the method comprises forming the housing assembly of any one of examples 1-17.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" or "disclosure" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. A housing assembly comprising:
a housing defining a housing cavity for holding electronics components, the housing including a housing wall that defines a mounting hole extending transversely therethrough, the housing wall having an outer side and having an opposite inner side which borders the housing cavity;
a hinge member mounted at least partially in the mounting hole, the hinge member being of one-piece construction and comprising a hinge formation projecting from the outer side of the housing wall for connection to a complementary hinge formation to form a hinge mechanism, the hinge member being anchored against axial movement through the mounting hole towards the inner side; and
an anchor plate located on the inner side of the housing wall, the anchor plate being transverse to the mounting hole and being connected to the hinge member such that axial movement of the hinge formation away from the outer side of the housing wall is resisted by obstruction of the anchor plate by the housing wall.

2. The housing assembly of claim 1, wherein the hinge member is anchored against axial movement towards the inner side of the housing wall by a flange forming part of the hinge member, the flange being located on the outer side of the housing wall and extending transversely relative to the mounting hole, such that at least part of the housing wall is sandwiched between the anchor plate and the flange, the anchor plate being larger in area than the flange of the hinge member.

3. The housing assembly of claim 1, wherein the hinge member further comprises a hinge post extending axially through at least part of the mounting hole, the anchor plate being connected to the hinge post.

4. The housing assembly of claim 3, further comprising a sealing member located radially about the hinge post to provide a sealing interface between the hinge post and the housing wall.

5. The housing assembly of claim 3, wherein the connection of the anchor plate to the hinge member is such that the anchor plate is rotationally fast with the hinge member, the anchor plate being rotationally anchored relative a longitudinal axis of the hinge post, rotation of the hinge member relative to the mounting hole being resisted by rotational anchoring of the anchor plate within the housing.

6. The housing assembly of claim 5, wherein the anchor plate is non-circular in outline and is located in a substantially complementary non-circular cavity defined by the housing, thereby to resist rotation of the anchor plate relative to the housing.

7. The housing assembly of claim 3, wherein the hinge member and the anchor plate are metal components, the housing wall being of a polymeric plastics material.

8. The housing assembly of claim 7, wherein the connection of the anchor plate to the hinge post comprises a welded connection.

9. The housing assembly of claim 8, wherein the connection of the anchor plate to the hinge post further comprises a securing screw co-axial with the mounting hole and screwingly received in the hinge post, such that a part of the anchor plate is held captive between a head of the securing screw and the hinge post.

10. The housing assembly of claim 7, further comprising one or more electronics components mounted in the housing cavity via the anchor plate, the anchor plate serving as a mounting base for the one or more electronics components.

11. The housing assembly of claim 7, wherein the anchor plate and the hinge member are in direct contact to permit heat conduction between them, the anchor plate being connected in heat transfer relationship to one or more heat generating components within the housing cavity, so that the anchor plate and the hinge member are configured to be connectable to an external heatsink such as to form part of a metal-to-metal heat transfer path from the housing cavity to the external heatsink.

12. The housing assembly of claim 1, further comprising an adhesive layer located between the anchor plate and the housing wall, adhesively attaching the anchor plate to the inner side of the housing wall.

13. The housing assembly of claim 12, wherein the adhesive layer is shaped and positioned such as to create a seal against ingress or moisture into the housing cavity via the mounting hole.

14. A device that comprises:
a housing defining a housing cavity for holding electronics components, the housing including a housing wall that defines a mounting hole extending transversely therethrough, the housing wall having an outer side and having an opposite inner side which borders the housing cavity;
a hinge member mounted at least partially in the mounting hole, the hinge member being of one-piece construction and comprising a hinge formation projecting from the outer side of the housing wall for connection to a complementary hinge formation to form a hinge mechanism, the hinge member being anchored against axial movement through the mounting hole towards the inner side; and
an anchor plate located on the inner side of the housing wall, the anchor plate being transverse to the mounting hole and being connected to the hinge member such that axial movement of the hinge formation away from the outer side of the housing wall is resisted by obstruction of the anchor plate by the housing wall.

15. The device of claim 14, wherein the device is an eyewear device comprising:
an eyewear frame that defines one or more optical element holders for holding respective optical elements within view of a user, when the eyewear device is worn, the housing assembly being incorporated in the eyewear frame such that the hinge formation of the hinge member projects from a lateral end portion of the eyewear frame;
a temple that is hingedly connected to the eyewear frame to be displaceable relative to the eyewear frame between a folded position and an extended position in which the eyewear device is in a wearable configuration; and
a hinge mechanism by which the temple is hingedly connected to the eyewear frame, the hinge mechanism comprising cooperating hinge formations provided respectively by:
the hinge formation of the hinge member mounted on the housing assembly; and
a hinge formation attached to a proximal end of the temple.

16. A method of manufacturing an eyewear device, the method comprising:
locating a hinge member on a housing wall of a housing for electronics components such that a hinge formation forming part of the hinge member projects away from an outer side of the housing wall for connection to a complementary hinge formation of a hinge mechanism to hingedly connect a temple component to an eyewear frame, a flange forming part of the hinge member being located on the outer side of the housing wall, the hinge member being a component of one-piece construction;
locating an anchor plate on an inner side of the housing wall, within a housing cavity defined by the housing, the anchor plate being substantially parallel to the housing wall; and
attaching the anchor plate to the hinge member, such that at least part of the housing wall is sandwiched between the anchor plate and the flange, movement of the hinge member away from the outer side of the housing wall being resisted by obstruction of the anchor plate against the housing wall.

17. The method of claim 16, wherein the locating of the hinge member on the housing comprises inserting a hinge post forming part of the hinge member co-axially into a mounting hole extending through the housing wall.

18. The method of claim 17, wherein the attaching of the anchor plate to the hinge member comprises welding the anchor plate to the hinge post.

19. The method of claim 18, wherein the welding of the anchor plate to the hinge post comprises a spot laser welding operation.

20. The method of claim 17, wherein the attaching of the anchor plate to the hinge member keys the anchor plate rotationally to the hinge member, and wherein the anchor plate is non-rotatably located within the housing cavity, so that rotation of the hinge member relative to the mounting hole is resisted by rotational anchoring of the anchor plate to the housing.

* * * * *